United States Patent [19]

Grotkasten

[11] Patent Number: 4,698,002
[45] Date of Patent: Oct. 6, 1987

[54] PNEUMATIC-TIRE HEATING AND VULCANIZING PRESS

[75] Inventor: Klaus Grotkasten, Hamburg, Fed. Rep. of Germany

[73] Assignee: Fried. Krupp Gesellschaft mit beschrankter Haftung, Essen, Fed. Rep. of Germany

[21] Appl. No.: 805,851

[22] Filed: Dec. 5, 1985

[30] Foreign Application Priority Data

Dec. 7, 1984 [DE] Fed. Rep. of Germany ....... 3444688

[51] Int. Cl.$^4$ .............................................. B29C 35/02
[52] U.S. Cl. ....................................... 425/28 R; 425/40
[58] Field of Search .................... 425/28 R, 28 D, 31, 425/32, 19, 34 R, 35, 17, 38, 49, 56, 39, 40, 25, 36, 19; 249/160, 161, 56, 57, 79, 65, 68; 100/93 P, 918; 403/13, 14; 248/637, 660, 661, DIG. 1

[56] References Cited

U.S. PATENT DOCUMENTS

| Re. 27,513 | 10/1972 | Pacciarini et al. | 425/39 |
| 3,901,632 | 8/1975 | Prosdocimi | 425/39 |
| 3,999,907 | 12/1976 | Pappas | 425/39 |
| 4,124,345 | 11/1978 | Grunner et al. | 425/39 |
| 4,129,406 | 12/1978 | Capecchi | 425/17 |
| 4,245,971 | 1/1981 | MacMillan | 425/17 |

*Primary Examiner*—Willard E. Hoag
*Attorney, Agent, or Firm*—Karl F. Ross; Herbert Dubno

[57] ABSTRACT

A hydraulic heating and vulcanization press includes a lower tire mold which is supported by a press stand and cooperates with an upper tire mold to define a mold in which a raw tire is inserted for subsequent vulcanization. In order to keep the lower and upper mold in a precisely centrally aligned position to each other, a plurality of centering elements are interposed between the press stand and the lower tire mold so as to allow a radial movement between the lower mold and the press stand in order to maintain a centrally aligned arrangement.

12 Claims, 2 Drawing Figures

PNEUMATIC-TIRE HEATING AND VULCANIZING PRESS

CROSS REFERENCE TO RELATED APPLICATION

This application is related to my commonly assigned copending application Ser. No. 06/801,083, filed Nov. 22, 1985.

FIELD OF THE INVENTION

My present invention relates to a hydraulic tire heating and vulcanizing press which, because it may use an inflatable bladder for supporting the tire blank or built-up carcass structure, can also be termed a bladder press for simultaneously molding and vulcanizing a raw tire.

BACKGROUND OF THE INVENTION

A tire heating or vulcanizing press can include a lower tire mold part which is supported on a press stand and has an upper tire mold part to define a mold in which a raw tire, i.e. a built-up tire blank, is placed for subsequent vulcanization.

In order to avoid mispressings, the raw tire or blank must be precisely centered within the lower mold and the upper tire must be accurately aligned with respect to the lower tire mold. To meet these requirements, it is thus not only necessary to guide the upper tire mold in a precise manner but also the lower tire mold must be maintained in a centered position. Therefore, it has been proposed to affix the lower mold to the press stand by bolts.

Although this principle may seem to be sound, it has the drawback that different thermal expansions of adjacent parts are not taken into account especially when considering the operating period of the bladder press from starting until it reaches actual operational or steady-state conditions. During this period, the precisely centered position of the lower tire mold could not be maintained.

OBJECTS OF THE INVENTION

It is thus the principal object of my invention to provide an improved tire bladder press obviating the aforestated drawback.

Yet another object of the invention is to provide an improved tire heating and vulcanization press which ensures precise centering of the lower mold part under all operating conditions of the press ranging from start-up through steady-state operations.

SUMMARY OF THE INVENTION

I realize this object according to the invention by providing a plurality of centering elements which are interposed between the lower tire mold and the supporting press stand and allow a radial movement between the latter parts to maintain the centrally aligned positions of the lower tire mold.

Specifically the lower tire mold part is supported on the press frame or stand by a plurality of angularly equispaced (rotationally symmetrically disposed) centering elements permitting radial movement of the lower mold part relative to the stand and hence centering of the lower mold part.

Through the provision of such centering elements varying thermal expansion between adjacent parts are compensated so that the lower tire mold constantly maintains its central position not only with respect to the press stand but also with respect to the upper tire mold.

According to another feature of the invention, the centering elements are constituted by keys (bars) which are accommodated in respectively registering or aligned grooves of the lower mold and of the press stand. Preferably, four such keys are positioned along two axes perpendicular to each other.

For heating and vulcanization presses which include a mold carrier, a heating ring and pressing cylinders between the lower tire mold and the press stand, it is preferred to provide additional centering elements between respectively adjacent parts to compensate any temperature drops and thus differential thermal expansion also between those parts.

More specifically the hydraulic tire vulcanization press can include:

a press stand;

a lower tire mold supported by the press stand;

an upper tire mold cooperating with the lower tire mold to define a mold in which a raw tire or built-up tire body is insertable; and first centering means positioned between the lower mold and the press stand for allowing radial movements between said lower mold and said press stand and for maintaining a central position of said lower tire mold.

The centering means can include registering radially extending grooves provided in the lower mold and the press stand and a respective key accommodated in each pair of registering grooves and fitting snugly but slidably therein.

The lower mold can define an axis and the centering means can include four such keys arranged symmetrically with respect to the axis, the keys being positioned along two diameters perpendicular to each other.

The press can also have pressing cylinders supported by the press stand for providing a locking force for the mold, a mold carrier supported by the pressing cylinders, a heating ring provided on the mold carrier and arranged below the lower tire mold part, and at least one spacer arranged between adjacent pressing cylinders for bridging the distance between the press stand and the mold carrier. Second centering means can be arranged between said spacer and said mold carrier. Third centering means can be positioned between the mold carrier and the heating ring, while fourth centering means are located between said heating ring and said lower tire mold.

The first, second, third and fourth centering means can be arranged in vertically aligned or offset relationship. All of the centering means can, as described for the first centering means, include keys bridging pairs of aligned radial slots.

BRIEF DESCRIPTION OF THE DRAWING

The above and other objects, features and advantages of my present invention will become more readily apparent from the following description, reference being made to the accompanying highly diagrammatic drawing in which.

SPECIFIC DESCRIPTION

Figure 2:
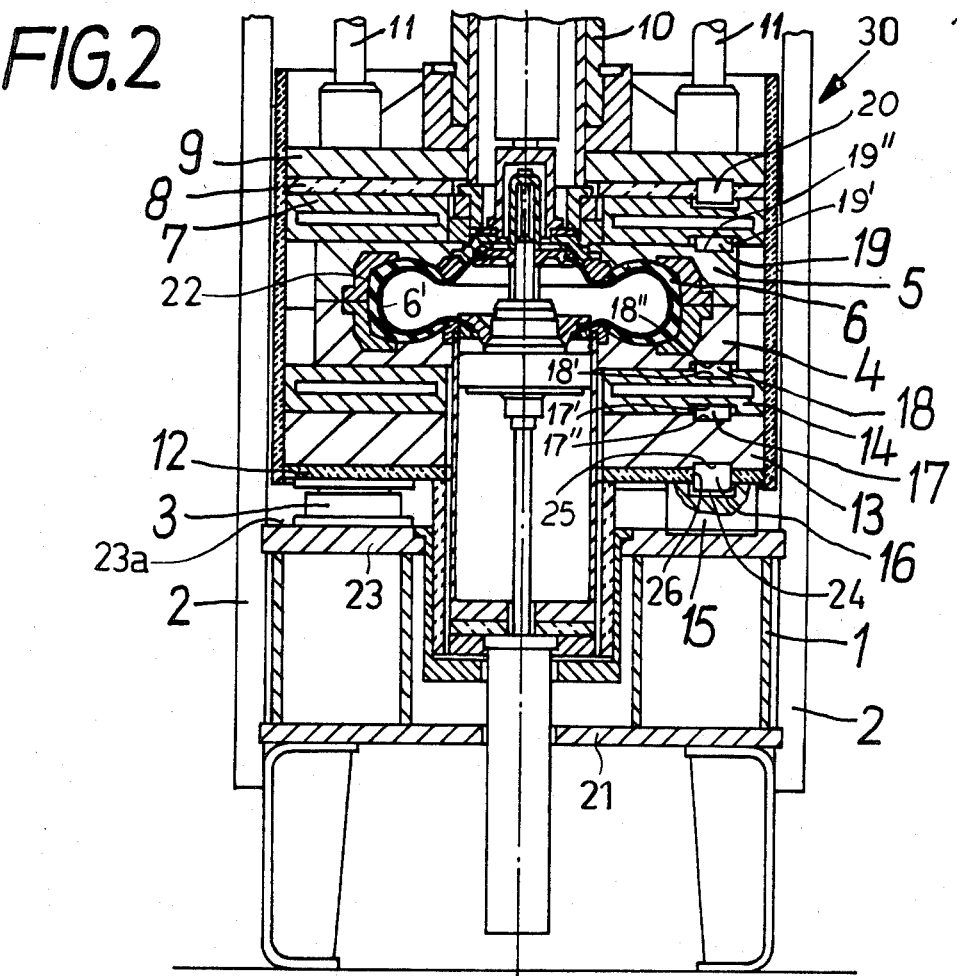
FIG. 2 is a cross sectional view of the heating and vulcanization press taken along line II—II in FIG. 1 and illustrated in a closed position.

In the drawing, I have shown a tire heating and vulcanization press which is generally designated by reference numeral 30 and provided for simultaneously molding and vulcanizing a raw tire 6 within which a bladder 6' can be inflated as is conventional. The heating and vulcanization press 30 includes a press stand 1 and two spaced side walls 2 extending parallel to each other in an upright position and connected at their lower section by a crossbar 21 which supports the press stand 1.

Connecting the side walls 2 at their upper section is a crosshead (not shown) which supports long-stroke piston-cylinder assemblies 11. In FIG. 2, only the lower part of the assemblies 11 is shown that is the lower part of respective pistons which are connected to a pressure plate 9. Fixed to the pressure plate 9 via an insulation ring 8 and a heating ring 7 is an upper tire mold 5 which cooperates with a lower tire mold 4 to define a mold cavity 22 in which the raw tire 3 is placed for vulcanization. By means of the long-stroke piston-cylinder assemblies 11, the upper mold 5 is movable in a vertical direction relative to the lower mold 4 to allow opening and closing of the mold and to provide access to the mold cavity 22.

Figure 1:
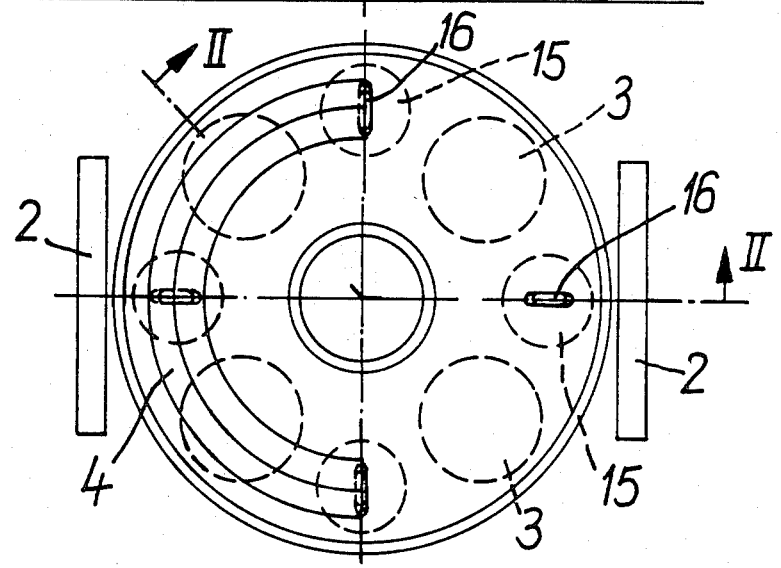
FIG. 1 is a top view of the lower tire mold part of a heating and vulcanization press according to the invention.

Supported by the crosshead at a central location thereof is a guide bar 10 (only its lower extremity is shown in FIG. 1) which extends parallel to the assemblies 11 and whose lower end is connected to the pressure plate 9. The guide bar 10 guides the upper tire mold 5 during its movement relative to the lower mold 4 so as to maintain a centered position thereof.

Arranged on the press stand 1 is a transverse press body or base 23 which supports four pressing cylinders 3 uniformly spaced about the upper surface 23a of the press base 23 (FIG. 2). The pressing cylinders 3, which communicate with a suitable hydraulic oil supply (not shown) to provide and maintain the locking pressure during vulcanization of the raw tire 6 within the mold cavity 22, support a mold carrier 13 via an interposed insulation 12 which is sleeve-shaped so as to extend also along the innerside of the side walls 2 beyond the pressure plate 9. Arranged between the mold carrier 13 and the tire mold 4 is a further heating ring 14.

As I have further shown in the drawing, between each pair of adjacent pressing cylinders, the press stand 1 supports a spacer 15. These spacers 15 bridge the distance between the press stand 1 and the insulation 12 along those areas in which no such pressing cylinders 3 are arranged without interfering with the vertical movement of the pressing cylinders 3 and the insulation 12.

In order to provide exact centering and alignment of the molds 4, 5 and to compensate different thermal expansions between the press stand 1 and the lower tire mold 4, centering elements are interposed to allow a radial movement therebetween. In the present embodiment in which the mold carrier 13, the heating ring 14 and the spacers 15 are arranged between the lower mold 4 and the press stand 1 such centering elements are provided between respectively adjacent parts.

As shown in FIG. 2, each centering element includes a key 16, i.e. a rectangular section metal bar, which is accommodated in respective registering fitting grooves 24, 25 of adjacent parts and which are respectively open upwardly and downwardly. Accordingly, each spacer 15 is provided with a groove 24 which cooperates with a respectively registering groove 25 in the mold carrier 13 and a through-hole 26 in the insulation 12 to accommodate a respective key 16 between the mold carrier 13 and the press stand 1. Each key lies in a radial vertical plane of the press. As shown in FIG. 1, there are four centering elements (or keys) 16 (received in respective pairs of grooves 24, 25) spaced about the circumference of the press stand 1 and extending along two axes perpendicular to each other so as to be symmetrically arranged with respect to the axis of the lower tire mold 4.

Likewise, to compensate varying thermal expansions between the mold carrier 13 and the heating ring 14, respective keys 17 (in upwardly and downwardly open grooves 17', 17") are interposed therebetween. Between the heating ring 14 and the lower tire mold four keys 18 are provided (in upwardly and downwardly open grooves 18', 18"). Consequently, a radial mobility is achieved of all structural elements by which the lower tire mold 4 is connected to the press stand 1.

Preferably, corresponding centering elements 16, 17, 18 are arranged one above the other vertically. However, there may be a case in which the parts are relatively thin so that an undesired weakening of such parts could occur by aligning the fitting grooves along a vertical line above each other. In such cases, the centering elements are offset from one another between the structural parts.

In FIG. 2, it is shown that additional keys 19 (only one is shown), in respective upwardly and downwardly open grooves 19', 19", are arranged in an axially symmetrical manner between the upper tire mold 5 and the heating ring 7 and keys 20 (only one is shown) are arranged in an axially symmetrical manner between the heating ring 10 and the pressure plate 9 so as to allow a radial movement of the upper tire mold and its adjacent parts relative to the guide bar 10.

I claim:

1. A hydraulic tire heating and vulcanizing press, comprising:

a press stand;

a one-piece tire-forming lower mold part supported by said press stand and surrounding an upright axis;

an upper tire-forming mold part mounted on said stand and aligned with said lower mold part along said axis, said mold parts defining between them in a closed position of said press a mold provided with heating means in which a tire blank can be vulcanized and shaped to form a tire;

hydraulic means for moving one of said mold parts axially relative to the other of said mold parts to open and close said mold; and centering means between said press stand and said one-piece tire-forming lower mold part effective in all operating temperature states of the press, even prior to the attainment of steady-state temperature operation, to permit movement radially of said axis between said lower mold part and said stand for maintaining a centered position of said lower mold part, said centering means comprising:

means forming at least two downwardly open radially extending grooves connected to said lower mold part, means forming at least two upwardly open radially extending grooves respectively paired with said downwardly open grooves and connected to said stand, and a respective radial key received in the upwardly and downwardly open grooves of each pair with play with respect to at least one of the grooves of the respective pair, said pairs of grooves and the respective keys being arranged symmetrically with respect to said axis.

2. The hydraulic heating and vulcanization press defined in claim 1 wherein four of said pairs of grooves and respective keys are provided.

3. The hydraulic heating and vulcanization press defined in claim 2 wherein said keys are positioned along two diameters perpendicular to each other.

4. The hydraulic heating and vulcanization press defined in claim 2, wherein said hydraulic means includes pressing cylinders supported by said press stand for providing a locking force for said mold, a mold carrier resting on said pressing cylinders, a heating ring provided on said mold carrier and arranged below said lower tire mold part and at least one spacer arranged between adjacent pressing cylinders for bridging the distance between said press stand and said mold carrier.

5. The hydraulic heating and vulcanization press defined in claim 4 wherein said keys and said grooves form first centering means between said lower mold part and said heating ring, further comprising second centering means arranged between said spacer and said mold carrier.

6. The hydraulic heating and vulcanization press defined in claim 5, further comprising third centering means arranged between said mold carrier and said heating ring.

7. The hydraulic heating and vulcanization press defined in claim 6 wherein said first, second, and third centering means are arranged in vertically superposed relationship.

8. The hydraulic heating and vulcanization press defined in claim 6 wherein said first, second, and third centering means are arranged one above another in an angularly offset relationship.

9. The hydraulic heating and vulcanization press defined in claim 2, further comprising additional centering means arranged symmetrically with respect to said axis for allowing a radial movement between said upper tire mold part and adjacent parts and for maintaining a central position of said upper tire mold part.

10. The hydraulic heating and vulcanization press defined in claim 9 wherein said additional centering means include a pair of registering radial grooves in said upper mold part and said press stand and a radial key received in and bridging said grooves of said pairs.

11. The hydraulic heating and vulcanization press defined in claim 10 wherein said additional centering means includes four such keys arranged symmetrically to said axis in respective pairs of registering grooves.

12. The hydraulic heating and vulcanization press defined in claim 11 wherein said keys of said addition centering means are positioned along two diameters perpendicular to each other.

* * * * *